Sept. 9, 1924.                J. LILLESÖE                1,508,107
             DEVICE FOR TANDEM SEATS FOR MOTOR CYCLES
                       Filed Sept. 3, 1921

Inventor:
J. Lillesöe,
By Marks & Clerk
         Attys.

Patented Sept. 9, 1924.

1,508,107

UNITED STATES PATENT OFFICE.

JENS LILLESÓE, OF HOLTE, DENMARK.

DEVICE FOR TANDEM SEATS FOR MOTOR CYCLES.

Application filed September 3, 1921. Serial No. 498,524.

*To all whom it may concern:*

Be it known that I, JENS LILLESÓE, a subject of the King of Denmark, residing at Vienna House, Holte, Denmark, have invented certain new and useful Improvements in Devices for Tandem Seats for Motor Cycles (for which I have filed an application in Denmark, June 1st, 1920, Patent No. 29,094, granted Dec. 16, 1921), of which the following is a specification.

My invention relates to tandem seats for motor-cycles. A characteristic feature of the invention is an improvement of the spring system contrived to permit an easy adjustment of the tandem seat springing to suit the weight of different riders. The invention also permits a second setting of the spring so as always to allow for an easy adjustment of the seat, placing it in a horizontal position when not in use.

The tandem seat is adapted for attachment to an ordinary luggage carrier or may be placed upon a hoop or fork on the rear frame of any motor-cycle.

The invention consists in certain combinations of parts recited in the appended claims.

Figure 1:
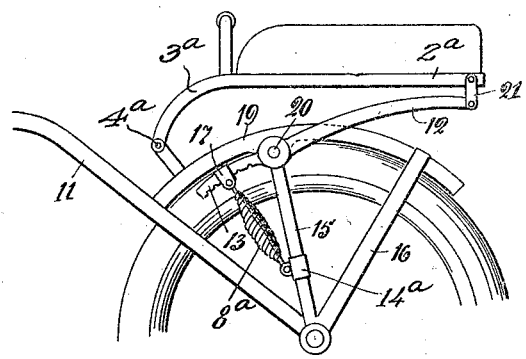

The invention is illustrated in the accompanying drawing in which Fig. 1 is a side elevation of one form of tandem seat in position upon the motorcycle.

Figure 2:
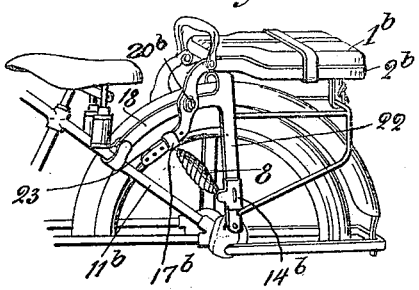

Fig. 2 is a perspective view of a modification.

As shown in Fig. 1, the prolongation 3ª of the top frame 2ª is hingedly connected by the bolt 4ª to an attachment forming part of a frame 19 connected with the rear frame of the motor cycle 11 and supported by two bars or stays 15 and 16.

In the former of these bars is mounted a bearing for a two-armed lever 12, 13, turnable on a pivot 20, the rear long arm 12 of which is connected by a link 21 to the top frame 2ª while the short, forward arm 13 is fitted with an adjustable clamp 17 to which is connected the spring 8ª.

The lower end of this spring is connected with another adjustable clamp 14ª, shiftable along the bar 15.

It will be seen that by shifting the clamp 14ª on the bar 15 the seat is adjustable in a horizontal plane, while by shifting the clamp 17, the springing can be adjusted according to the weight of the rider.

There must be one double armed lever 12, 13 on each side. It is not necessary to employ special levers 12, 13, as the top frame itself may form the rear arm of the lever and the prolongation of the top frame the forward arm.

This last form is shown in Fig. 2.

As shown in Fig. 2, the tandem seat 1ᵇ and top frame 2ᵇ are turnable on the pivot 20ᵇ mounted on a pair of arms forming part of a hoop 22 secured to the rear frame of the motor-cycle 11ᵇ.

The adjustment of the seat itself is effected by moving the clamp 17ᵇ along the extensions 23 and by moving the clamp 14ᵇ along the bar 22, in the same way as described in connection with Fig. 1.

Having now particularly described and ascertained the nature of my said invention and in what manner the same is to be performed, I declare that what I claim is:—

1. In passenger seats for motor-cycles, a bottom frame adapted to be connected to a motor-cycle, a top frame provided with double armed levers pivotally connected to said bottom frame, a spring arranged between one of said levers and the bottom frame, means for adjustably connecting one end of said spring to one arm of the lever, and adjustable means for connecting the other end of said spring to the bottom frame.

2. In passenger seats for motor-cycles, a bottom frame adapted to be connected to a motor-cycle, a top frame having forwardly extending arms pivotally connected to the bottom frame, springs arranged between said forwardly projecting arms and the bottom frame, and means for shifting the springs relatively to the forwardly extending arms.

3. In passenger seats for motor-cycles, an inverted U-shaped bottom frame adapted to be connected to a motor-cycle and provided with forwardly extending arms, a top frame carrying a seat and provided with lever arms pivotally connected intermediate their ends to the arms of the bottom frame, and adjustable springs connecting the forward portions of the lever arms to the bottom frame.

4. In passenger seats for motor-cycles as claimed in claim 3, adjustable means connecting the upper ends of said springs to said lever arms.

5. The combination with a motor-cycle, of an inverted U-shaped member connected to the motor-cycle and having forwardly extending arms, double ended levers having their intermediate portions pivotally connected to said forwardly extending arms, a seat supported by the rear portion of the double ended levers, and coil springs adjustably connected to the forward ends of said double ended levers and to said U-shaped member.

In testimony whereof I affix my signature in presence of two witnesses.

JENS LILLESÓE.

Witnesses:
CHAS. HUCH,
S. MÒLGAARD.